(12) United States Patent
Erba et al.

(10) Patent No.: US 6,292,233 B1
(45) Date of Patent: Sep. 18, 2001

(54) DEVICE CONTROLLER WITH LOW POWER STANDBY MODE

(75) Inventors: Gianluca Erba, Busnago; Fabio Grilli, Monza, both of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/224,261

(22) Filed: Dec. 31, 1998

(51) Int. Cl.[7] ....................................................... H04N 5/63
(52) U.S. Cl. ............................... 348/730; 455/343; 307/64
(58) Field of Search ..................................... 348/730, 734, 348/553; 363/17, 21; 315/411; 307/43, 132, 116, 125, 126, 128, 130, 64, 65; 455/343

(56) References Cited

U.S. PATENT DOCUMENTS

| 5,175,441 | * | 12/1992 | den Hollander | 307/43 |
| 5,414,475 | * | 5/1995 | Trzyna et al. | 348/730 |
| 5,995,384 | * | 11/1999 | Majid et al. | 348/730 |

* cited by examiner

*Primary Examiner*—Victor R. Kostak
(74) *Attorney, Agent, or Firm*—Theodore E. Galanthay; Robert Iannucci; Seed IP Law Group PLLC

(57) ABSTRACT

A device controller controls access to a device, such as a television, having a power input for receiving power and a data input for receiving control data. When in standby mode, the device controller disconnects the device from a power source, such as the AC mains of the building in which the device is situated. As a result, in standby mode only the device controller is powered, which uses much less power than prior art devices in standby mode. The device controller includes an input device structured to provide control data based on control instructions received from a user, a power switch coupled between a power source and the device power input, and a data coupler coupled to the device data input and structured to convert electrical data into non-electrical data and back to the electrical data for delivery to the device data input. The device controller also includes a controller structured to cause the data coupler to provide the control data to the device data input, decode the control data, and if the control data indicates that the user desires to turn on the device when in standby mode, then causes the power switch to deliver power from the power source to the device power input.

17 Claims, 2 Drawing Sheets

DEVICE CONTROLLER WITH LOW POWER STANDBY MODE

TECHNICAL FIELD

This invention relates to device controllers, such as television controllers, and more particularly, to device controllers with low power standby modes.

BACKGROUND OF THE INVENTION

When one considers energy production and consumption, conservation is of prime concern in order to protect our habitat and for economic reasons. In most commercial settings, lights are controlled to avoid wasting unused energy and other equipment is kept off when not needed.

Although many strides have been made in energy conservation, many more are needed, particularly in our homes. For example, most current television sets have a standby mode during which power consumption has been reduced to 5–13 W. When the television set is in standby mode, it is always ready to operate as soon as a remote control command button is pressed. This simplifies the television turn on sequence, which is especially convenient for people with disabilities of various sort, and also reduces wasted time waiting for the television to operate. Considering that just in the United States, if there is one television in standby mode for every ten people, then there are 25 million such television sets. If the average television set uses 8 W in standby mode, then there are 200 MW of power waste.

SUMMARY OF THE INVENTION

A first embodiment of the present invention is directed to a device controller for controlling access to a device, such as a television, having a power input for receiving power and a data input for receiving control data. When in standby mode, the device controller disconnects the device from a power source, such as the AC mains of the building in which the device is situated. As a result, in standby mode only the device controller is powered, which uses much less power than prior art devices in standby mode.

The device controller includes an input device structured to provide control data based on control instructions received from a user, a power switch coupled between a power source and the device power input, and a data coupler coupled to the device data input and structured to convert electrical data into non-electrical data and back to the electrical data for delivery to the device data input. The device controller also includes a controller coupled to the input device, power switch, and data coupler and being structured to cause the data coupler to provide the control data to the device data input, decode the control data, and if the control data indicates that the user desires to turn on the device when in standby mode, then causes the power switch to deliver power from the power source to the device power input.

A second embodiment is directed to a television controller for a television having a power input. The television controller includes an input device structured to provide control data based on control instructions received from a user, a power switch coupled between a power source and the television power input, a power supply stage coupled between the power supply and the power switch and coupled to the input device to supply power thereto during the standby mode. The power switch disconnects the television power input from the power source when in a standby mode. A controller coupled to the input device, power switch, and power supply stage is structured to decode the control data, and if the control data indicates that the user desires to turn on the television when in standby mode, then cause the power switch to deliver power from the power source to the television power input.

DETAILED DESCRIPTION

Figure 1:
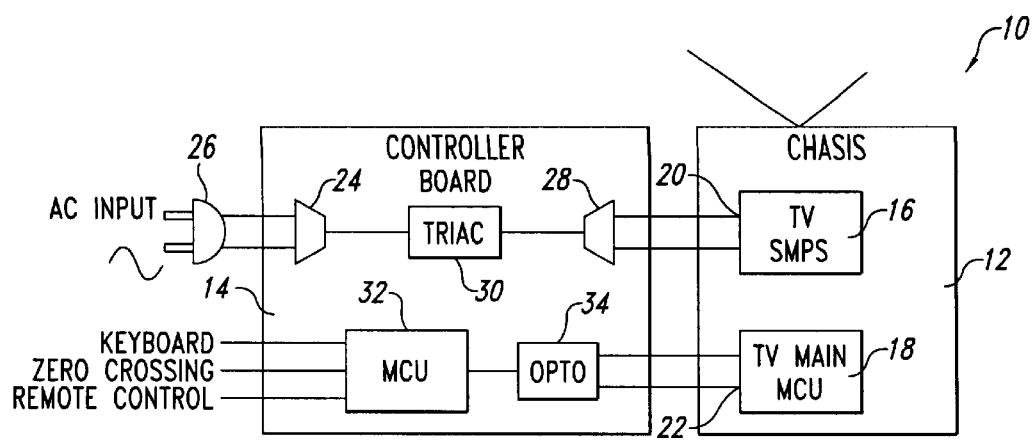
FIG. 1 is a block diagram of a television with low power standby controller board according to an embodiment of the present invention.

A television 10 according to a first embodiment of the invention is shown in FIG. 1. It will be appreciated that the invention is not solely embodied in a television, and the inventive concepts discussed herein can be applied in many other contexts as those of ordinary skill in the art will realize.

The television 10 includes a chassis 12 and a controller board 14 for controlling the chassis. Typically, the controller board 14 will be incorporated within the chassis 12, but is shown separately in FIG. 1 so that its added functionality will be easily appreciated. The chassis 12 includes a main power supply circuit 16 coupled to supply power to a main microcontroller unit 18 that controls the display of images on the television screen (not shown). The main power supply circuit 16 includes a power input 20 for receiving power from a power source such as the AC mains of the building in which the television is situated. The main microcontroller unit 18 includes a data input 22 that receives control data as discussed in more detail below. The chassis 12, without the controller board 14, can be any of numerous known televisions to which the controller board is easily adapted.

The controller board 14 includes an input power port 24, which receives input power from the AC mains via a typical electrical plug 26, and an output power port 28 that supplies power to the main power supply circuit 16 via the power input 20. Connected between the input and output power ports 24, 28 is a controlled switch 30 which is shown as a triac in FIG. 1 although other known switches, such as various transistors, could be employed. The controller board 14 also includes a microcontroller 32 connected to the triac 30 and to a photocoupler 34 connected to the data port 22 of the main microcontroller unit 18 of the television chassis 12.

Figure 2:
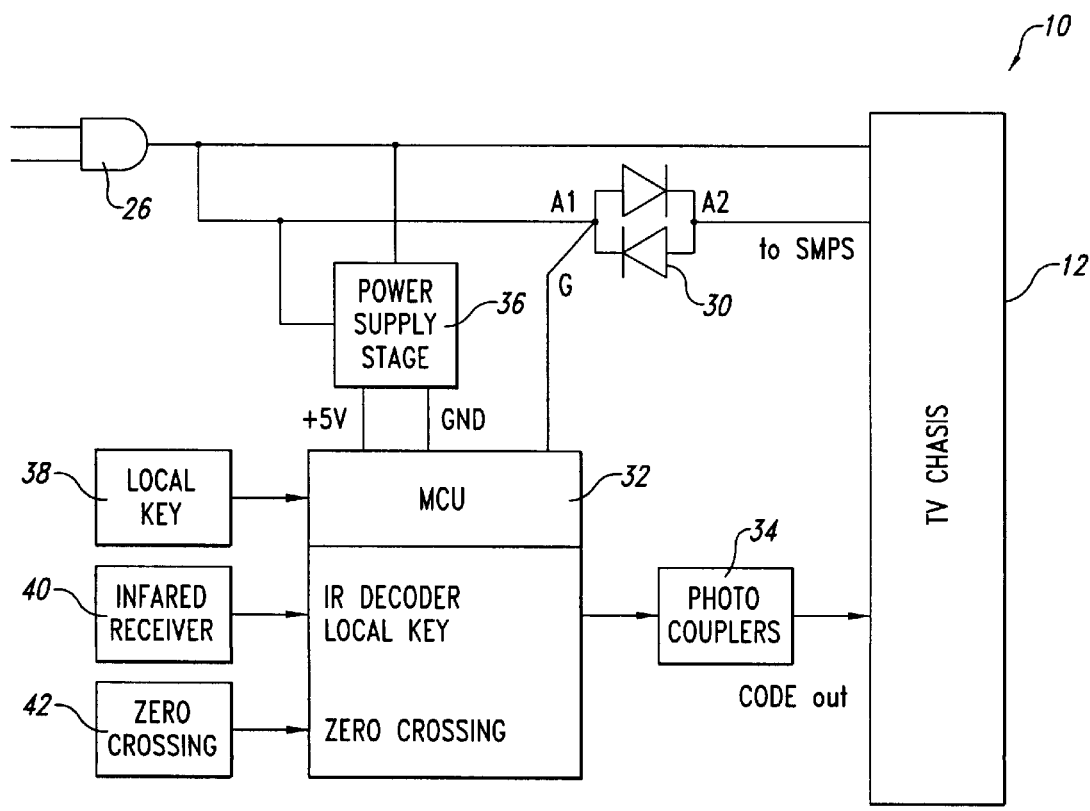
FIG. 2 is a detailed block diagram of the controller board of the television shown in FIG. 1.

As shown in FIG. 2, the controller board 14 also includes a power supply stage 36 connected between the AC mains and the microcontroller 32. In addition, the controller board includes a local keyboard 38, an infrared receiver 40, and a zero crossing detector 42 each coupled to the microcontroller 32. The local keyboard 38 is an optional component that allows control signals to be input to the microcontroller from an adjacent position. The infrared receiver 40 receives infrared control signals from a remote control device (not shown), converts them to electrical control signals, and forwards the electrical control signals to the microcontroller 32. The zero crossing detector detects when the current from the AC mains is close to zero and sends an appropriate control signal to the microcontroller 32.

The microcontroller 32 controls the triac 30 based on the control signals received from the keyboard 38, infrared receiver 40, and zero crossing detector. When in standby mode, the microcontroller 32 keeps open the triac 30 to keep the television chassis 12 disconnected from the AC mains. In response to the keyboard, zerocrossing, and remote control signals when in standby mode, the microcontroller 32 closes the triac 30 to connect the television chassis to the AC mains and thereby allow normal operation of the television 10. In addition, the keyboard and remote control signals are decoded and sent to the main microcontroller unit 18 via the photocoupler 34 and the data input 22. In one implementation, the microcontroller 32 is an ST6203 microcontroller from STMicroelectronics, the assignee of the present application, although other microcontrollers could be employed. The microcontroller 32 is appropriately programmed to provide the switch control, decoding, and data reception/transmission functions discussed herein, although hard-wired logic could also be employed.

The power supply stage 36 receives power directly from the AC mains to supply power to the microcontroller 32 and the infrared receiver 40. As a result, controller board 14 has its own ground that is different from the other grounds present in the television chassis 12. As such, the galvanic insulation of the various circuits of the television chassis 12 must be protected. For that reason, the photocoupler 34 is employed to transmit the control data from the microcontroller 32 to the main microcontroller unit 18. The photocoupler 34 provides an electrical decoupling function in that it converts electrical signals to non-electrical, light based signals that it reconverts to electrical signals. Thus, the electrical control signals transmitted to the main microcontroller unit 18 are independent of the different grounds employed by the main microcontroller unit 18 and the microcontroller 32. It will be appreciated that other electrical decouplers could be employed in place of the photocoupler 34, such as a magnetic transformer.

Figure 3:
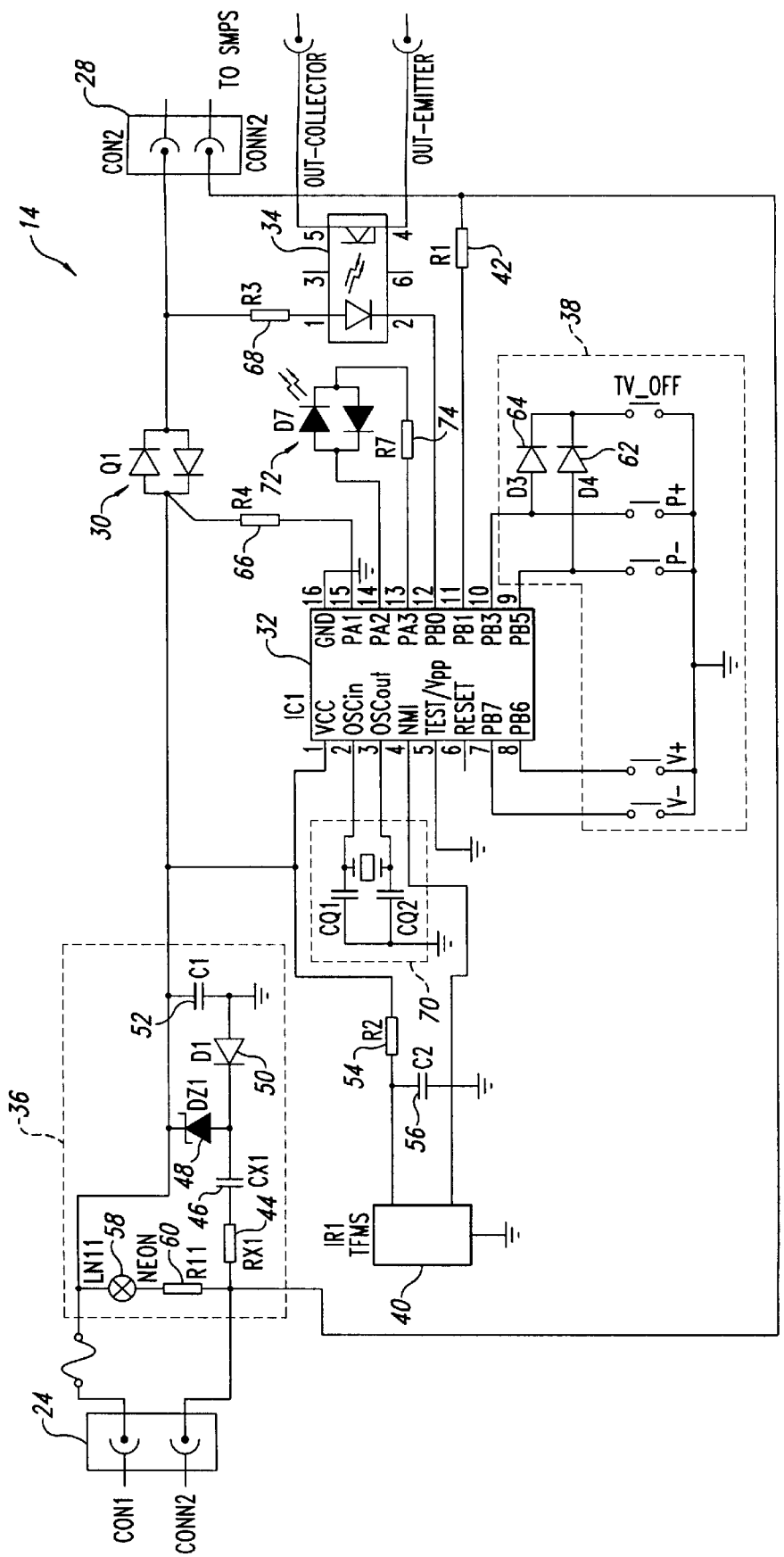
FIG. 3 is a circuit diagram of the controller board shown in FIG. 2.

A detailed circuit diagram of the controller board 14 is shown in FIG. 3. The power supply stage 36 includes a first resistor 44 in series with a first capacitor 46, both connected to a terminal of the input connector 24. The power supply stage 36 also includes a zener diode 48, a diode 50, and a second capacitor 52 connected as shown. One plate of the second capacitor is coupled to a power (Vcc) pin of the microcontroller 32, to a first terminal of the infrared receiver 40 via a second resistor 54, and to the controller board ground via the second resistor 54 and a third capacitor 56. Although optional, the power supply stage 36 also includes a neon light 58 with a third resistor 60 to provide a signal indicating that power is being supplied by the AC mains to the controller board 14.

The zener diode 48 clamps the voltage output by the power supply stage 36 to a desired value, such as 5 V based on an input voltage from the AC mains of 220 V. The diode 50 rectifies the AC voltage from the zener diode 48 and the second capacitor 52 filters it to ensure that a proper DC voltage is output by the power supply stage 36. The first capacitor 46 is very important in that it fixes the maximum current available for the rest of the controller board 14 and greatly influences the power consumption of the controller board during the standby mode. A first capacitor 46 of 470 nF has been found to provide a good current level at a very low power level.

The local keyboard 38 has five keys: volume down V−, volume up V+, program down P−, program up P+, and TV_off. The first four keys are directed connected to respective I/O pins of the microcontroller 32 and the TV_off key is coupled to the P− and P+ keys via respective second and third diodes 62, 64. Connected the local keyboard 38 directly to the microcontroller 32 rather than through an analog/digital converter eliminates the power usage associated with such a converter.

The triac 30, photocoupler 34, infrared receiver 40, and zerocrossing detector 42 are also connected to respective I/O pins of the microcontroller. The triac 30 has input and output terminals respectively connected to the power supply stage 36 and the output connector 28 and a control terminal connected to its microcontroller I/O pin via a fourth resistor 66. The photocoupler 34 has an input data terminal coupled to its microcontroller I/O pin, a power terminal connected to the output terminal of the triac 30 via a fifth resistor 68, and two output pins connected to the data input 12 of the main microcontroller unit 18. The infrared receiver 40 is coupled to a non-maskable interrupt (NMI) pin of the microcontroller 32 to ensure that any control data provided by the infrared receiver 40 is processed by the microcontroller without any interruptions that could cause the control data to be lost.

The controller board 14 also includes an oscillator 70 and a bicolor LED indicator 72 connected to appropriate pins of the microcontroller 32. The LED indicator 72 is connected to a microcontroller pin via a sixth resistor 74 and provides information regarding the status of the television chassis 12. When the microcontroller 32 is powered and the television chassis is OFF, as indicated by whether the microcontroller has closed the triac 30, then the LED indicator 72 is red. When the television chassis 12 is ON, the LED indicator 72 is green.

The controller board 14 can be easily connected to almost any existing television chassis 12 in as little as three steps. To do so, one removes an existing infrared receiver that was connected to the main microcontroller unit 18. A collector pin of the photocoupler 34 is connected to a non-maskable interrupt pin of the main microcontroller unit 18 and an emitter pin of the photocoupler is connected to the ground of the chassis 12. The output port 28 is connected to the power input 20 of the main power supply circuit 16.

The operation of the controller board 14 begins when the plug 26 is plugged in to the AC mains and electricity is provided to the power supply stage 36. The power supply stage 36 provides power to the microcontroller 32 and the infrared receiver 40 and when the correct voltage is achieved, the controller board will be ready to operate. The microcontroller 32 initially keeps the triac 30 open, so no power is provided to the chassis 12.

In response to receiving a command from either the local keyboard 38 or the infrared receiver 40, the microcontroller 32 decodes the command and determines whether it is a valid command. If the command is valid, then the microcontroller 32 switches ON the triac 30 and, after a programmable delay, transmits a control code corresponding to the command to the main microcontroller unit 18 via the photocoupler 34. The delay in the transmission of the control code is employed because the main power supply circuit 16 needs a certain time to reach the nominal working condition, e.g., 0.5 seconds). Therefore, the main microcontroller unit 18 will not be able to properly receive the control data until it is properly powered by the main power supply circuit. To avoid having to delay too long and to cover the spread of the starting time, the first control code is repeated for a couple of seconds.

When the television 10 is operating in normal mode, the microcontroller 32 decodes the incoming commands from the keyboard 38 and infrared detector 40 and transmits the appropriate control codes to the main microcontroller unit 18. In response to a TV_OFF command, the microcontroller 32 sends the OFF control code to the main microcontroller unit 18 which responds by shutting down the television display. After another programmable delay, the microcontroller 32 opens the triac 30, which returns the television 10 to standby mode.

Because only the microcontroller 32 and the infrared receiver 40 need to be powered in standby mode, the television 10 uses very little power. For an AC input voltage of 220 V +/−20% (Europe) and 110 V +/−20% (United States) using a first capacitor 46 of 470 nF, the following power consumption levels (mW) were obtained.

TABLE 1

| Voltage (V) | 90 | 110 | 130 | 180 | 220 | 270 |
|---|---|---|---|---|---|---|
| With neon light 58 | 110 | 140 | 170 | 220 | 250 | 300 |
| With LED 72 | 130 | 170 | 190 | 270 | 320 | 400 |

Even with the neon indicator 58 and the LED indicator 72, the highest power consumption level during standby mode of the controller board 14 was 400 mW, which is an order of magnitude less than the typical consumption levels of prior art televisions.

Although the television context was discussed herein, it will be appreciated that the controller board 14 could be employed to provide a low power consumption standby mode to numerous other devices, such as computers, stereos, and air conditioners. Such a controller board can provide both a switch for disconnecting a controlled device from a power supply and a data coupler for safely providing control data to the controlled device. Such an arrangement is both very economical to operate and simple to implement.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A device controller for controlling access to a device having a power input for receiving power and a data input for receiving control data, comprising:
   an input device structured to provide control data based on control instructions received from a user;
   a triac coupled between a power source and the device power input, the triac having a control terminal;
   a data coupler coupled to the device data input and structured to convert electrical data into non-electrical data and back to the electrical data for delivery to the device data input; and
   a controller coupled to the input device and data coupler and coupled to the control terminal of the triac without an intervening coupling device that converts electrical signals into non-electrical signals and back to the electrical signals, the controller being structured to cause the data coupler to provide the control data to the device data input, decode the control data, and if the control data indicates that the user desires to turn on the device when in standby mode, then causes the switch to deliver power from the power source to the device power input.

2. The device controller of claim 1 wherein the data coupler includes a photocoupler.

3. The device controller of claim 1 wherein the input device includes a receiver that receives control signals from a remote control unit operated by the user.

4. The device controller of claim 1 wherein the controller includes a microcontroller programmed to control the triac and provide the control data to the data coupler based on the control data received from the input device.

5. The device controller of claim 1, further comprising:
   a power supply stage coupled between the power supply and the triac and coupled to the controller to supply power thereto, the power supply stage having a ground that is different than a ground of the device.

6. The device controller of claim 5 wherein the power supply stage includes a clamping element that converts a relatively high voltage of the power source to a relatively low voltage suitable for powering the controller, a filter element that filters out AC elements of the voltage of the power source, and a delay stage that limits current in-rush to the filter element when power is supplied initially from the power source.

7. The device controller of claim 6 wherein the clamping element is a zener diode and the delay stage includes a series connection of a resistor and a capacitor that are connected to a terminal of the power supply.

8. The device controller of claim 1 wherein the device is a television and the controller is a microcontroller programmed to provide the control data in a format compatible with the television.

9. A television controller for a television having a power input, comprising:
   an input device structured to provide control data based on control instructions received from a user;
   a triac coupled between a power source and the television power input, the triac having a control terminal and disconnecting the television power input from the power source when in a standby mode;
   a power supply stage coupled between the power supply and the triac and coupled to the input device to supply power thereto during the standby mode, and
   a controller coupled to the input device and power supply stage, and coupled to the control terminal of the triac without an intervening coupling device that converts electrical signals into non-electrical signals and back to the electrical signals, the controller being structured to decode the control data, and if the control data indicates that the user desires to turn on the television when in standby mode, then cause the triac to deliver power from the power source to the television power input.

10. The television controller of claim 9 wherein the television has a data input, the television controller further comprising a data coupler coupled between the controller and the television data input and structured to convert electrical control data from the controller into non-electrical data and back to the electrical control data for delivery to the television data input.

11. The television controller of claim 9 wherein the data coupler includes a photocoupler.

12. The television controller of claim 9 wherein the input device includes a receiver that receives control signals from a remote control unit operated by the user.

13. The television controller of claim 9 wherein the power supply stage includes a clamping element that converts a relatively high voltage of the power source to a relatively low voltage suitable for powering the controller, a filter element that filters out AC elements of the voltage of the power source, and a delay stage that limits current in-rush to the filter element when power is supplied initially from the power source.

14. A television having a standby mode of reduced power use, comprising:

a main microcontroller that controls how images are displayed on the television;

a main power circuit that receives power from AC mains of a building in which the television is used; and an input controller that includes:

an input device structured to provide control data based on control instructions received from a user;

a triac coupled between the AC mains and the main power circuit, the triac having a control terminal and disconnecting the main power circuit from the AC mains when in a standby mode;

a power supply stage coupled between the AC mains and the triac and coupled to the input device to supply power thereto during the standby mode, and a controller coupled to the input device and power supply stage, and coupled to the control terminal of the triac without an intervening coupling device that converts electrical signals into non-electrical signals and back to the electrical signals, the controller being structured to decode the control data, and if the control data indicates that the user desires to turn on the television when in standby mode, then cause the triac to deliver power from the AC mains to the main power circuit.

15. The television of claim 14 wherein the input controller further includes a data coupler coupled between the controller and the main microcontroller and structured to convert electrical control data from the controller into non-electrical data and back to the electrical control data for delivery to the main microcontroller.

16. The television of claim 14 wherein the data coupler includes a photocoupler.

17. The television of claim 14 wherein the power supply stage includes a clamping element that converts a relatively high voltage of the AC mains to a relatively low voltage suitable for powering the controller, a filter element that filters out AC elements of the voltage of the AC mains, and a delay stage that limits current in-rush to the filter element when power is supplied initially from the AC mains.

* * * * *